United States Patent
Bevan et al.

(10) Patent No.: US 6,381,397 B1
(45) Date of Patent: Apr. 30, 2002

(54) FIBER OPTIC ARRAY BREAKOUT HOUSING

(75) Inventors: Dennis P. Bevan, Westlake Village; John E. Mansell, Thousand Oaks, both of CA (US)

(73) Assignee: Northrop Grumman Corporation, Woodland Hills, CA (US)

( * ) Notice: Subject to any disclaimer, the term of this patent is extended or adjusted under 35 U.S.C. 154(b) by 0 days.

(21) Appl. No.: 09/564,847

(22) Filed: May 4, 2000

(51) Int. Cl.$^7$ .............................................. G02B 6/00
(52) U.S. Cl. ...................................................... 385/139
(58) Field of Search ................................ 385/135, 136, 385/137, 138, 139, 12, 115, 147

(56) References Cited

U.S. PATENT DOCUMENTS

| 4,428,645 A | * | 1/1984 | Korbelak et al. | ........... 385/135 |
| 5,420,957 A | * | 5/1995 | Burek et al. | ................. 385/135 |
| 5,617,501 A | * | 4/1997 | Miller et al. | ................. 385/134 |
| 5,644,671 A | * | 7/1997 | Goetter et al. | .............. 385/135 |

\* cited by examiner

Primary Examiner—Tulsidas Patel
(74) Attorney, Agent, or Firm—Lynn & Lynn

(57) ABSTRACT

A housing for holding components of a fiber optic sensor array includes a base formed generally as an elongate rectangle with end caps connected to its ends. The sensor array includes an array cable formed of a plurality of constituent cables that each comprise an optical fiber and a tensile strength member corresponding to each optical fiber. Each end cap is formed to include a plurality of cable termination slots for connection to the strength members of selected constituent cables to which array components are connected and a plurality of cable bypass slots for routing constituent cables that are not connected to components around the housing.

8 Claims, 3 Drawing Sheets

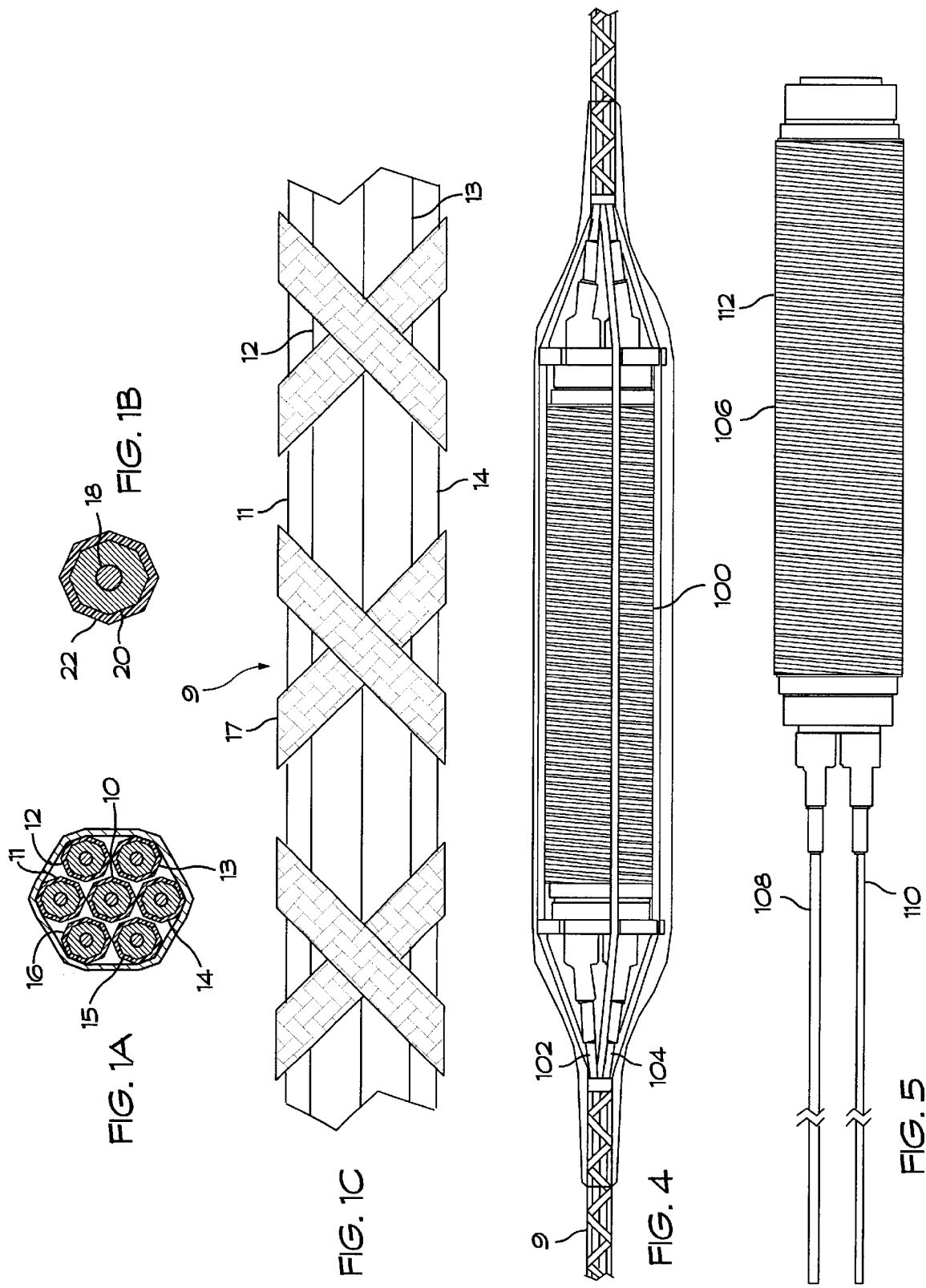

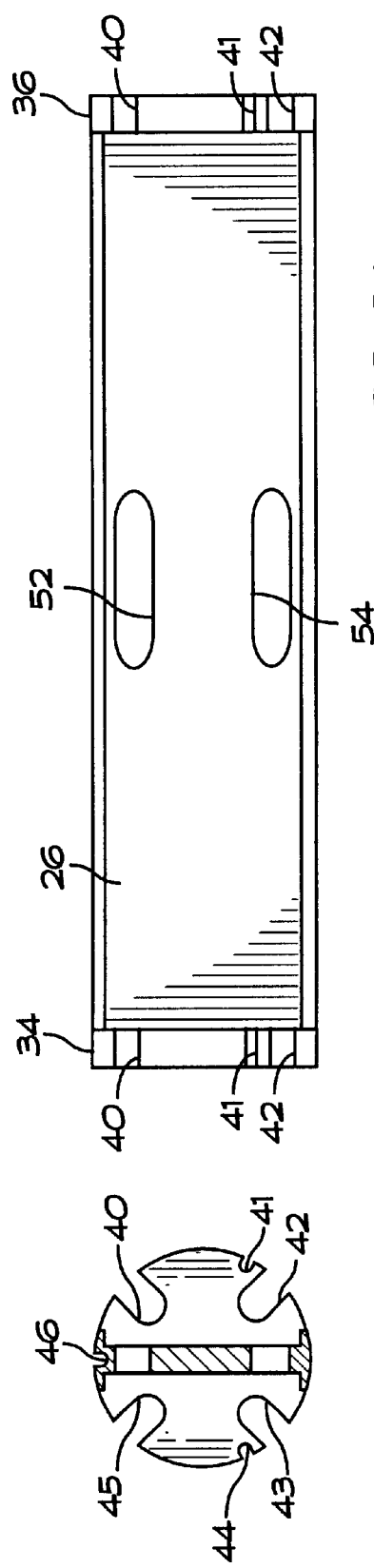
FIG. 2A
FIG. 2B
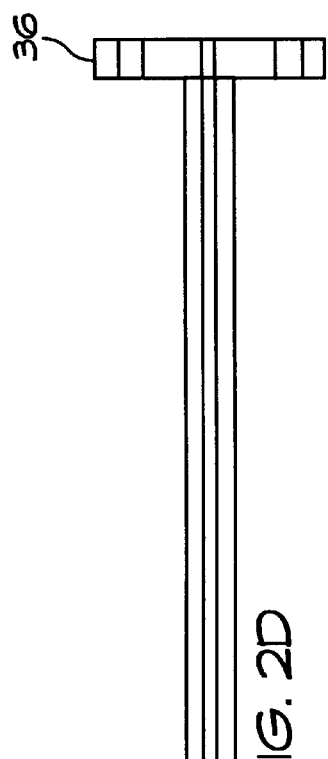
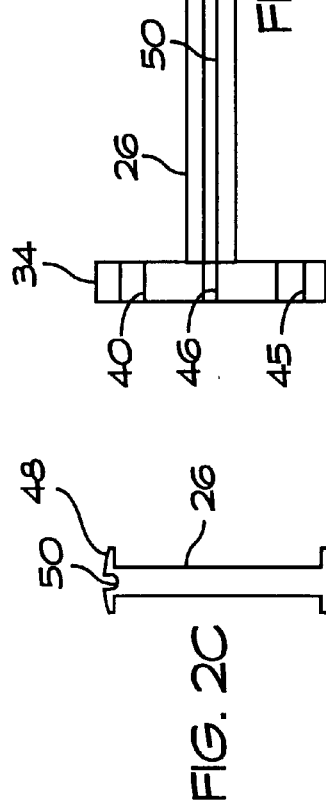
FIG. 2C
FIG. 2D

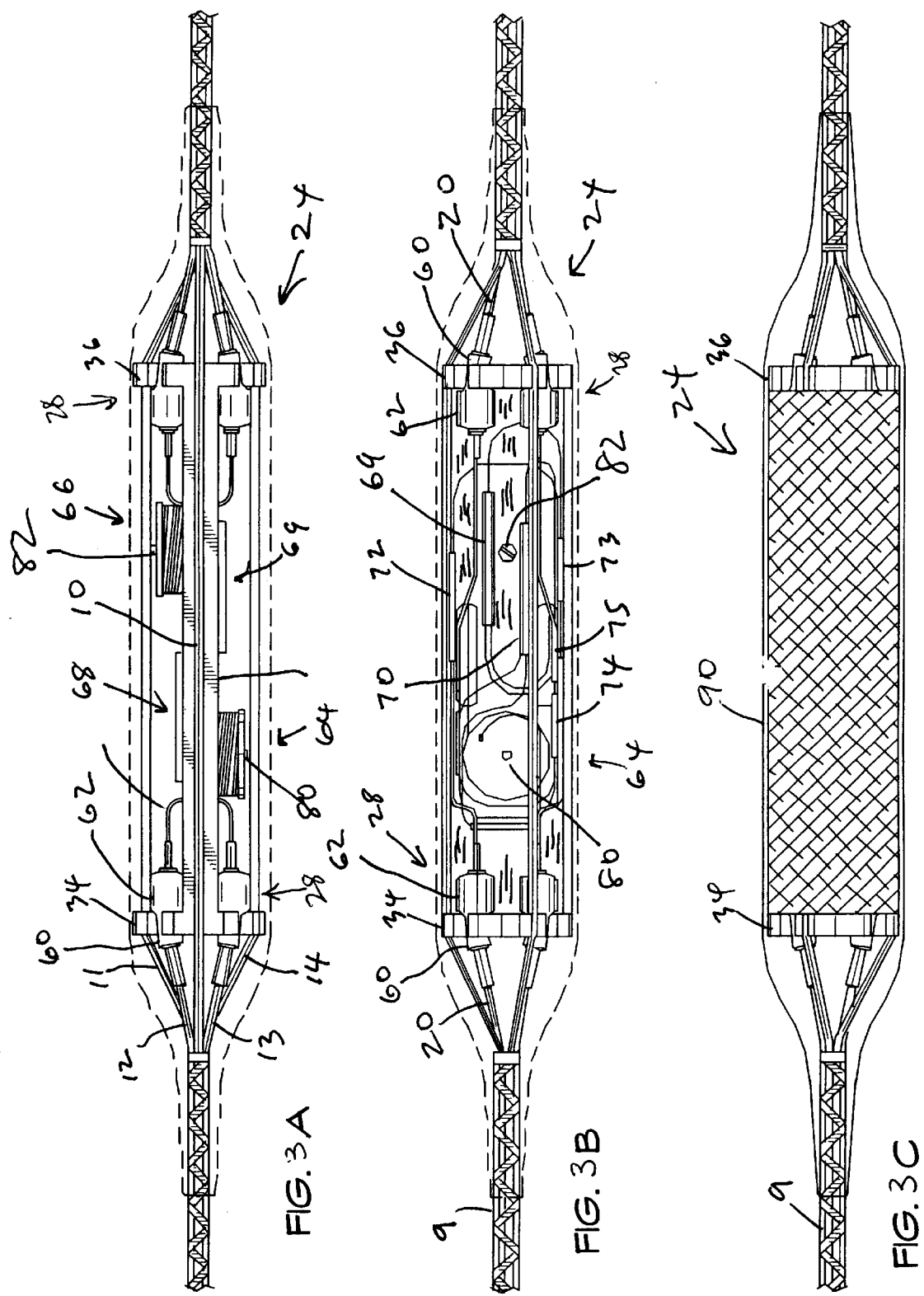

FIBER OPTIC ARRAY BREAKOUT HOUSING

STATEMENT OF GOVERNMENT RIGHTS IN INVENTION

The United States Government has rights in this invention under contract No. N00039-95-C-0072.

BACKGROUND OF THE INVENTION

This invention relates generally to techniques for constructing fiber optic sensor arrays, particularly fiber optic hydrophone arrays. Still more particularly, this invention relates to a housing for connection to an array cable to contain array components and maintain the tensile strength of the array cable.

A towed array generally includes hydrophones and telemetry couplers spliced together and packaged loosely within a foam body, which is then placed within a strength member frame and booted within a hose. For bottom arrays, integration occurs by cutting into a pre-fabricated cable and, once integrated, the hydrophones and telemetry couplers are overmolded for protection.

Generally, for both approaches, the optical fiber used between hydrophones and telemetry components is either tight buffered, in a loose tube (loose buffered), or has the standard thin acrylate buffering. This makes them tend to be susceptible to damage, especially at either splice locations or at transition points from the outer jacketing to the bare fiber.

SUMMARY OF THE INVENTION

A housing for connection to a fiber optic array cable formed of a plurality of constituent cables that each comprise an optical fiber and a tensile strength member corresponding to each optical fiber to form a fiber optic sensor array comprises a base formed generally as an elongate rectangle with end caps connected to its ends. Each end cap is formed to include a plurality of cable termination slots for connection to the strength members of selected constituent cables to which array components are connected and a plurality of cable bypass slots for routing constituent cables that are not connected to components around the housing.

A surface of the base may include a cable bypass slot so that a constituent cable that will not be connected to array components in the housing may be routed past the housing.

Each end cap preferably includes a symmetrical arrangement of the cable termination slots, which formed to retain cable terminators connected to the respective strength members of the constituent cables.

BRIEF DESCRIPTION OF THE DRAWINGS

FIG. 1A is a cross sectional view of an array cable that is included in a fiber optic sensor array showing a plurality of jacketed optical fibers retained in a harness;

FIG. 1B is an expanded scale cross sectional view of one of the jacketed optical fibers included in the array cable of FIG. 1A.

FIG. 1C is a side elevation view of a portion of the apparatus of FIG. 1A;

FIGS. 2A–2D illustrate a breakout housing according to the present invention that may be used with the array cable of FIGS. 1A–1C to form a fiber optic hydrophone array.

FIG. 3A shows optical fiber components inside a breakout housing according to the present invention;

FIG. 3B shows the apparatus of FIG. 3A rotated 90°;

FIG. 3C shows the final assembly of the harness and breakout housing;

FIG. 4 shows a first hydrophone formed using the array cable of FIGS. 1A–1C and the breakout housing of FIGS. 2A–2D and FIGS. 2A and 2B; and FIG. 5 shows a second hydrophone that may be formed using the array cable of FIGS. 1A–1C and the breakout housing of FIGS. 2A–2D and FIGS. 2A and 2B.

DETAILED DESCRIPTION OF THE INVENTION

FIG. 1A shows an array cable 9 formed to include a plurality of constituent cables 10–16 secured within a harness 17. The constituent cables 10–16 may be formed to essentially identical. FIG. 1B illustrates the components of each of the constituent cables 10–16. For example, an optical fiber 18 passes axially through the axial center of the constituent cable 10. A plurality of metal strands 20 are then layered about the outside of the optical fiber 18. The metal strands 20 around the optical fiber 18 function as a strength member that protects the optical fiber from breaking when tension is applied to the array cable 9. The metal strands 20 are then covered with a jacket 22 formed of a material such as nylon. In this way, each constituent cable 10–16 has its own internal strength member and is individually armored to protect it from the outside environment. The constituent cables 10–16 are then placed in parallel alignment and wrapped with the harness 17 as shown in FIGS. 1A and 1C. The harness 17 may be formed of straps of nylon, dacron or other similar substance. The array cable 9 is bound together using some such means as tape, interwoven string, injected polyurethane (or polyethylene) jacketing or dacron lacing tape.

The diameter of the array cable assembly 9 preferably is about 0.19". The preferred range of diameters of the array cable assembly 9 is from about 0.18" to 0.0195." The working strength of the array cable assembly 9 is typically about 50 pounds, and its breaking strength is at least 150 pounds. Typical lengths of the array cable 9 used in forming a hydrophone array range from about 10 to 100 meters.

Any number of constituent cables 10–16 may be secured in the harness. Seven constituent cables 10–16 are shown to illustrate the principles of the invention. In addition, each of the constituent cables 10–16 may include a plurality of optical fibers (not shown) instead of a single optical fiber 18 as described with reference to FIG. 1A.

Constructing a fiber optic hydrophone array begins with constructing lengths of array cables 9 as described above. The ends of the constituent cables 10–16 are secured and tension is applied to them. The harness 17 is then bundled on the constituent cables 10–16 until the area where the hydrophone is to be integrated. Splices and components such as optical couplers, delay coils, hydrophones etc. are then integrated into the array cable 9 as described subsequently using a breakout housing 24. As shown in FIGS. 2A–2D, 3A and 3B, the breakout housing 24 includes a breakout base 26 connected between two end caps 34 and 36. As shown in the top plan view of FIG. 2A, the breakout base has a flat, rectangular shape. In the side elevation view of FIG. 2D, the breakout base 26 and the end caps 34 and 36 cooperate to form a wide H-shaped structure with the end caps 34 and 36 being the upright portions of the "H" and the breakout base 26 being the cross bar. The end caps 34 and 36 are essentially identical.

As shown in FIGS. 2A and 2B, the end cap 34 is formed to have a generally thin cylindrical shape. A plurality of slots 40–46 that are preferably generally U-shaped are formed in the curved side of the end cap 34. The slots 40–46 are angularly spaced apart and extend the full length of the end cap 34 parallel to its longitudinal axis. The slots 40, 42, 43 and 45 are cable termination slots. The slots 41, 43 and 46 are bypass cable slots.

As shown in FIGS. 2B–2D, an edge 48 of the breakout base 26 may include a lengthwise slot 50 that is aligned with the slot 46 in the end cap 34. As shown in FIG. 2A, the breakout base 26 preferably includes openings 52 and 54 that allow optical fiber to be passed from one side of the breakout base 26 to the other.

Referring to FIGS. 3A and 3B, when integrating the breakout housing 24 into the array cable 9, constituent cables 10, 11 and 14 that will not be used in the breakout housing 24 are routed through the cable bypass slots 41, 43 and 46 in both end caps 34 and 36. Constituent cables 12, 13, 15, 16 to which components are to be spliced are cut where splices are to be formed. Cable terminators 28 are securely connected to the strength members 20 of the constituent cables 12, 13, 15, 16 where they pass through the end caps 34 and 36 at the cable termination slots 40, 42, 43 and 45. The cable terminators 28 are formed as stepped cylinders having a smaller diameter portion 60 that passes through the cable termination slots 40, 42, 43 and 45 and a larger diameter portion 62 having a diameter sufficiently large that it will not pass through the cable termination slots 40, 42, 43 and 45 when the constituent cables 12, 13, 15 and 16 are under tension.

The structure of the array cable 9 as described above, the cable terminators 28 and the breakout housing cooperate to provide a sturdy structure in which array components may be mounted without breaking the optical fibers in the constituent cables 9–16. For example, FIGS. 3A and 3B show delay coils 64 and 66, couplers 68–70 and associated splices 72–75 inside the breakout housing 24. The delay coils 64 and 66 may be secured to the breakout base 26 with suitable fasteners such as screws 80 and 82. Splice protectors and coupler housings may be secured to the breakout base by a suitable adhesive.

The fibers passed to the interior of the breakout housing are spliced to the telemetry components and secured to the breakout tray 26. The breakout cavity is preferably filled using a hard epoxy resin to protect the components and splices from the environment. The entire unit can then be overmolded with a polyurethane or polyethylene cover 90 as shown in FIG. 3C. The horizontal portion 34 of the tray 32 is used to hold the splices, optical couplers and any other telemetry components that the telemetry scheme may dictate.

Additionally, the leads from the hydrophones included in the sensor array are made from the same constituent cables used in the harness.

In an array, a plurality of breakout housings substantially identical to the breakout housing 24 are used to house the telemetry couplers and to serve as a means to protect splices and bare fiber areas. Terminations are fittings which contain the strength member portion of the constituent cable, but allow the center fiber(s) to pass through and into the breakout housing. The terminations are arranged in a symmetric pattern in the end caps 34 and 36 of the breakout tray 26 in such a way as to use the tray 26 to assist in the load bearing scheme of the array. Any constituent cables which do not need splices in the breakout are passed about the exterior of the tray.

As shown in FIG. 4, a hydrophone 100 is constructed such that its leads 102 and 104 are made from the selected constituent cables in the array cable 9. When the hydrophone 100 is integrated into the array cable 9, those constituent cables which are not in use are cut and terminated to one side of the hydrophone. The hydrophone leads then replace those unused cables between the hydrophone and the breakout housing. All other constituent cables are then run about the exterior of the hydrophone. The hydrophone can then be overmolded in the same manner as described above for the breakouts.

FIG. 5 shows another fiber optic hydrophone 106 that may have constituent cables 108 and 110 arranged as its leads and connected to a breakout housing 112 according to the present invention.

When all work terminating the breakouts is complete, molds are applied and the cavity is filled with a hard epoxy resin and allowed to cure. After cure, outer molds are applied and the outer molding material is injected and allowed to cure. These steps are repeated in a serial manner until the array is complete.

This array design can be used as is for an ocean bottom cable, molded to a consistent diameter throughout for seismic applications. or placed in foam and booted into a hose for a towed array.

The structures and methods disclosed herein illustrate the principles of the present invention. The invention may be embodied in other specific forms without departing from its spirit or essential characteristics. The described embodiments are to be considered in all respects as exemplary and illustrative rather than restrictive. Therefore, the appended claims rather than the foregoing description define the scope of the invention. All modifications to the embodiments described herein that come within the meaning and range of equivalence of the claims are embraced within the scope of the invention.

What is claimed is:

1. A housing for connection to a fiber optic array cable formed of a plurality of constituent cables that each comprises an optical fiber and a tensile strength member corresponding to each optical fiber to form a fiber optic sensor array, comprising:
    a base formed generally as an elongate rectangle;
    a first end cap connected to a first end of the base; and
    a second end cap connected to a second end of the base, each end cap being formed to include:
        a plurality of cable termination slots for connection to the strength members of selected constituent cables to which array components are connected such that tensile loads applied to the strength members of the selected constituent cables are transferred to the housing to provide a continuation of the load-bearing capabilities of the selected constituent cables; and
        a plurality of cable bypass slots for routing constituent cables that are not connected to components around the housing.

2. The housing of claim 1 wherein a surface of the base has a cable bypass slot therein.

3. The housing of claim 1 wherein each end cap includes a symmetrical arrangement of the cable termination slots formed to retain cable terminators connected to the respective strength members of the constituent cables.

4. An apparatus for forming a fiber optic sensor array, comprising:
    a plurality of constituent cables, each constituent cable comprising an optical fiber and a strength member connected to the optical fiber to provide tensile strength;

a base formed generally as an elongate rectangle;

a first end cap connected to a first end of the base; and a second end cap connected to a second end of the base, each end cap being formed to include:
- a plurality of cable termination slots for connection to the strength members of selected constituent cables to which array components are connected such that tensile loads applied to the strength members of the selected constituent cables are transferred to the housing to provide a continuation of the load-bearing capabilities of the selected constituent cables; and
- a plurality of cable bypass slots for routing constituent cables that are not connected to components around the housing.

5. The apparatus of claim 4 further comprising a harness arranged to enclose the plurality of constituent cables securely.

6. The apparatus of claim 4 wherein the strength member comprises a plurality of metal strands layered around the optical fiber.

7. A housing for connection to a fiber optic array cable formed of a plurality of constituent cables that each comprises an optical fiber and a tensile strength member corresponding to each optical fiber to form a fiber optic sensor array, comprising:

a base formed generally as an elongate rectangle;

a first end cap connected to a first end of the base; and a second end cap connected to a second end of the base, each end cap being formed to include;
- a plurality of cable termination slots for connection to the strength members of selected constituent cables to which array components are connected such that tensile loads applied to the strength members of the selected constituent cables are transferred to the housing to provide a continuation of the load-bearing capabilities of the selected constituent cables.

8. An apparatus for forming a fiber optic sensor array, comprising:

a plurality of constituent cables, each constituent cable comprising an optical fiber and a strength member connected to the optical fiber to provide tensile strength;

a base formed generally as an elongate rectangle;

a first end cap connected to a first end of the base; and a second end cap connected to a second end of the base, each end cap being formed to include:
- a plurality of cable termination slots for connection to the strength members of selected constituent cables to which array components are connected such that tensile loads applied to the strength members of the selected constituent cables are transferred to the housing to provide a continuation of the load-bearing capabilities of the selected constituent cables.

* * * * *